United States Patent
O'Mahony et al.

(10) Patent No.: US 11,190,958 B2
(45) Date of Patent: Nov. 30, 2021

(54) ADAPTIVE DETECTION OF WIRELESS LINK PARAMETERS

(71) Applicant: Analog Devices International Unlimited Company, Limerick (IE)

(72) Inventors: Cornelius O'Mahony, Limerick (IE); Michael O'Brien, Munster (IE); Andre Wolokita, Melbourne (AU); Gina Aquilano, Somerville, MA (US); Sean Williams, Melbourne (AU)

(73) Assignee: Analog Devices International Unlimited Company, Limerick (IE)

( * ) Notice: Subject to any disclaimer, the term of this patent is extended or adjusted under 35 U.S.C. 154(b) by 1 day.

(21) Appl. No.: 16/186,758

(22) Filed: Nov. 12, 2018

(65) Prior Publication Data

US 2020/0154293 A1    May 14, 2020

(51) Int. Cl.
| | |
|---|---|
| *H04W 24/00* | (2009.01) |
| *H04W 24/08* | (2009.01) |
| *H04W 88/16* | (2009.01) |
| *H04B 1/713* | (2011.01) |

(52) U.S. Cl.
CPC ............ *H04W 24/08* (2013.01); *H04B 1/713* (2013.01); *H04W 88/16* (2013.01)

(58) Field of Classification Search
CPC combination set(s) only.
See application file for complete search history.

(56) References Cited

U.S. PATENT DOCUMENTS

| | | | |
|---|---|---|---|
| 6,185,418 B1* | 2/2001 | MacLellan | H04B 1/0003 455/418 |
| 9,060,340 B2* | 6/2015 | Chen | H04W 52/245 |
| 9,118,513 B2 | 8/2015 | Velazquez et al. | |
| 2006/0205396 A1* | 9/2006 | Laroia | H04L 1/0015 455/422.1 |
| 2007/0098093 A1* | 5/2007 | Kwon | H04L 1/0026 375/260 |
| 2011/0135033 A1* | 6/2011 | Ko | H04B 7/0413 375/295 |
| 2014/0036702 A1* | 2/2014 | Van Wyk | H04L 43/0823 370/252 |
| 2016/0029190 A1* | 1/2016 | Rattner | H04W 76/10 455/414.4 |

* cited by examiner

*Primary Examiner* — Lakeram Jangbahadur
(74) *Attorney, Agent, or Firm* — Schwegman Lundberg & Woessner, P.A.

(57) ABSTRACT

A wireless communication system includes at least one transmitter and at least one receiver. The transmitter is configured to establish wireless link parameters and transmit a data communication using the wireless link parameters. The receiver is configured to receive the data communication, automatically identify one or more of the wireless link parameters using the data, and extract a payload using the identified wireless link parameters. Prior to receiving the data communication, the receiver requires limited information concerning the wireless link parameters established by the transmitter. The wireless link parameters can include selectable aspects such as one or more of a transmission channel, a transmission data rate, a modulation format, a transmission power, a packet format, and a channel coding scheme.

17 Claims, 12 Drawing Sheets

ADAPTIVE DETECTION OF WIRELESS LINK PARAMETERS

TECHNICAL FIELD

This document pertains generally, but not by way of limitation, to wireless networks, and particularly but not by way of limitation to adaptive establishment and detection of wireless link parameters.

BACKGROUND

In wireless communication, two devices can communicate using a link configuration that establishes how the wireless communication occurs. The link configuration includes one or more parameters that define various aspects of the wireless transmission. These parameters can be predefined for a network such that all devices transmit using the same link configuration.

SUMMARY

The present inventors have recognized, among other things, that it can be desirable to allow a transmitter to establish wireless link parameters, such as unilaterally, prior to transmitting a wireless communication to one or more receivers. A receiver can be configured to determine the wireless link parameters based on information extracted from the wireless communication with limited prior information concerning the wireless link parameters established by the transmitter prior to receiving the wireless communication. The receiver can use the determined wireless link parameters to extract a payload of the wireless communication. In this manner, overhead can be reduced as compared to other approaches, or power efficiency can be enhanced, such as by automatically adjusting one or more wireless link parameters in response to changing environmental or operational conditions.

In one example, the communication system can include or use a first circuit and a second circuit. The first circuit can be configured to establish the wireless link parameters and transmit a wireless communication using the wireless link parameters. The second circuit can be configured to receive the wireless communication, automatically determine the wireless link parameters based on information extracted from the wireless communication, and extract a payload from the wireless communication using the wireless link parameters.

In another example, a method of performing wireless communication in a network can include establishing, by a first circuit, first link parameters for wireless communication and transmitting, by the first circuit, a first communication using the first link parameters. This can also include receiving, by a second circuit, the first communication, and determining, automatically by the second circuit, the first link parameters based on information extracted from the first communication. The method can also include extracting, by the second circuit, a payload of the first communication using the first link parameters.

In another example, a wireless network includes a node device and an access device. The node device can include means for establishing wireless link parameters and means for transmitting a wireless communication using the wireless link parameters. The access device can include means for receiving the wireless communication, means for automatically identifying the wireless link parameters using information extracted from the wireless communication, and means for extracting a payload of the wireless communication using the wireless link parameters.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A receiver architecture for use in a wireless network is disclosed herein that permits autonomous detection and adaption by a receiver to dynamic wireless link configurations. A transmitter is configured to establish wireless link parameters and transmit a data communication using the wireless link parameters. A receiver is configured to receive the data communication, identify the wireless link parameters using the data, and extract a payload using the identified wireless link parameters. Prior to receiving the data communication, the receiver does not require information concerning the wireless link parameters established by the transmitter. The wireless link parameters can include selectable aspects such as one or more of a transmission channel, a transmission data rate, a modulation format, a transmission power, a packet format, and a channel coding scheme.

Generally available techniques of providing adaptive link configurations might involve the use of management packets provided to the receiver in advance of the data transmission. Such an approach can present challenges, such as consuming extra overhead within the network, or other effects such as increased energy usage. For example, link configuration changes were dependent on the successful exchange of the management packets. By contrast, the present inventors have developed a scheme implementing a receiver architecture that facilitates identification of the wireless link parameters using the data transmission without prior knowledge of the link parameters. Accordingly, an overhead penalty associated with use of management packets can be reduced or eliminated. Such an approach can provide other enhancements, such as facilitating reduced transmission power or decreased latency associated with adapting to the RF environment. Such enhancement can improve quality of one or more service metrics, such as relating to packet delivery reliability (e.g., packet error rate, frame error rate, or bit error rate), or can provide enhanced spectrum utilization.

Figure 1A:
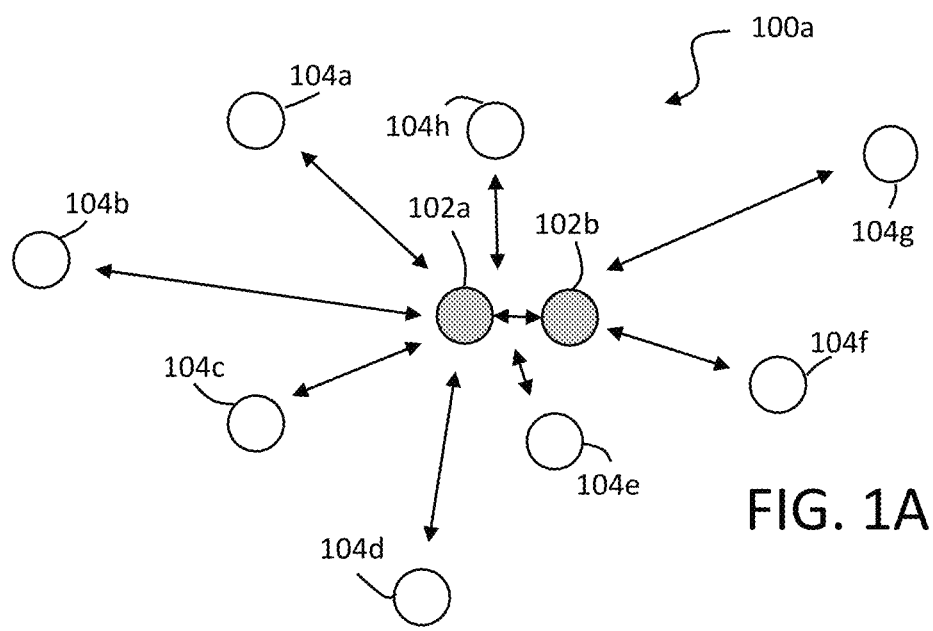
FIG. 1A is a diagram illustrating an example wireless network that includes nodes networked in a star configuration.
Figure 1B:
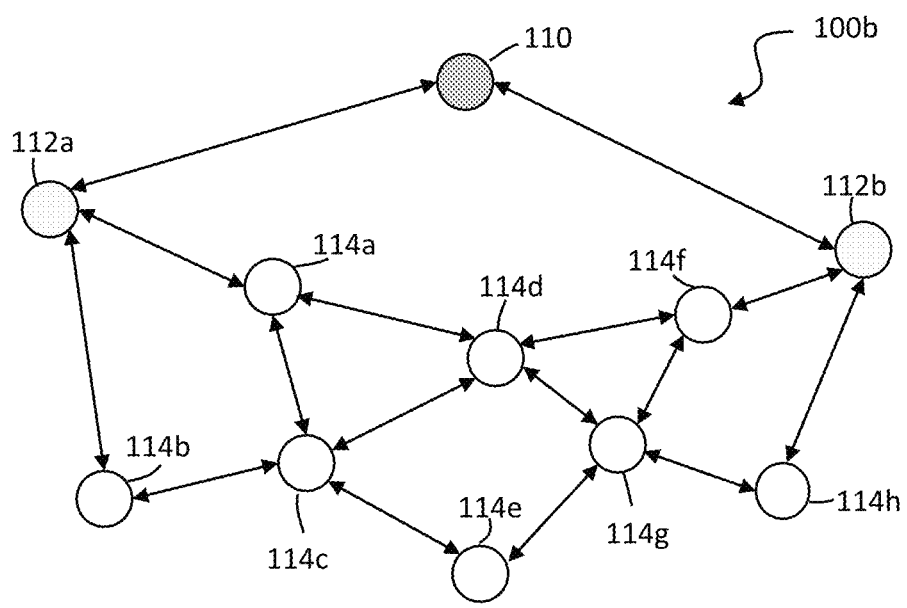
FIG. 1B is a diagram illustrating an example network that includes nodes networked in a mesh configuration.

FIG. 1A is a network diagram illustrating an example network 100a configured using a star topology, and FIG. 1B is a network diagram illustrating an example network 100b configured using a mesh topology. Other network topologies not illustrated in FIGS. 1A and 1B can also be used, such as multi-hop topologies, for example. In the example illustrated in FIG. 1A, the network 100a includes two gateways 102a and 102b each configured to communicate with nodes 104a-104h. While illustrated as eight nodes 104a-104h and two gateways 102a and 102b, the network 100a can include any number of gateways connected to communicate with any number of nodes.

In an example, the network 100a can be implemented on a vehicle to monitor the health of a vehicle component(s), such as a battery. In this example, the nodes 104a-104h can be placed throughout the vehicle and configured to sense characteristics of the monitored components. The sensed characteristics can be provided to the gateways 102a and 102b for data collection and reporting. In some examples, the gateways 102a and 102b can provide the data to a central control system (such as an electronic control unit (ECU) or other element in a vehicular electrical system). The central control system can use the data to monitor the health of, and provide control for, the vehicle component(s). In other examples, the network 100a can be implemented in other applications, such as transportation applications involving aircraft, spacecraft, or rail, or in an industrial setting or any other environment.

The gateways 102a and 102b can be connected to each other via a wired or wireless connection and configured to communicate redundantly with the nodes 104a-104h. Additionally, the gateways 102a and 102b can be connected via a wired or wireless connection to a control system through redundant pathways. In one example, the gateways 102a and 102b can be connected to an ECU via an Ethernet connection.

In the example illustrated in FIG. 1B, the wireless network 100b includes a gateway 110, access points 112a and 112b, and nodes 114a-114h configured in a mesh topology. While illustrated as eight nodes 114a-114h, two access points 112a and 112b, and one gateway 110, the network 100b can be configured to include any number of nodes, access points, and gateways. The access points 112a and 112b can be connected to the gateway 110 through either a wireless or wired connection. The gateway 110 can also be connected to a separate control system via a wired connection, such as an Ethernet connection, for example.

Wireless communication can occur in either direction between the nodes 104a-104h and the gateways 102a and 102b for the wireless network 100a, and can occur in either direction between any of the nodes 114a-114h, and between the nodes 114a-114h and the access points 112a and 112b for the wireless network 100b. In each wireless communication, one device acts as the transmitter and the other device acts as the receiver. The data is transmitted using a link configuration that includes several wireless link parameters. In one example, the transmitter can establish a set of wireless link parameters by selecting from a group of possible parameters established by the network. The transmitter packages and sends a data communication to the receiver using the established link parameters. The receiver identifies the link parameters by extracting information from the data communication and extracts a payload from the data communication using the identified link parameters. In an example, the receiver can package and send an acknowledgement to the transmitter using the identified link parameters. Generally, the apparatus and techniques described herein facilitate coexistence between nodes (such as nodes 104a-104h in FIG. 1A, nodes 114a-114h in FIG. 1B, or any other nodes) within a network, and with nodes of other networks.

Figure 2:
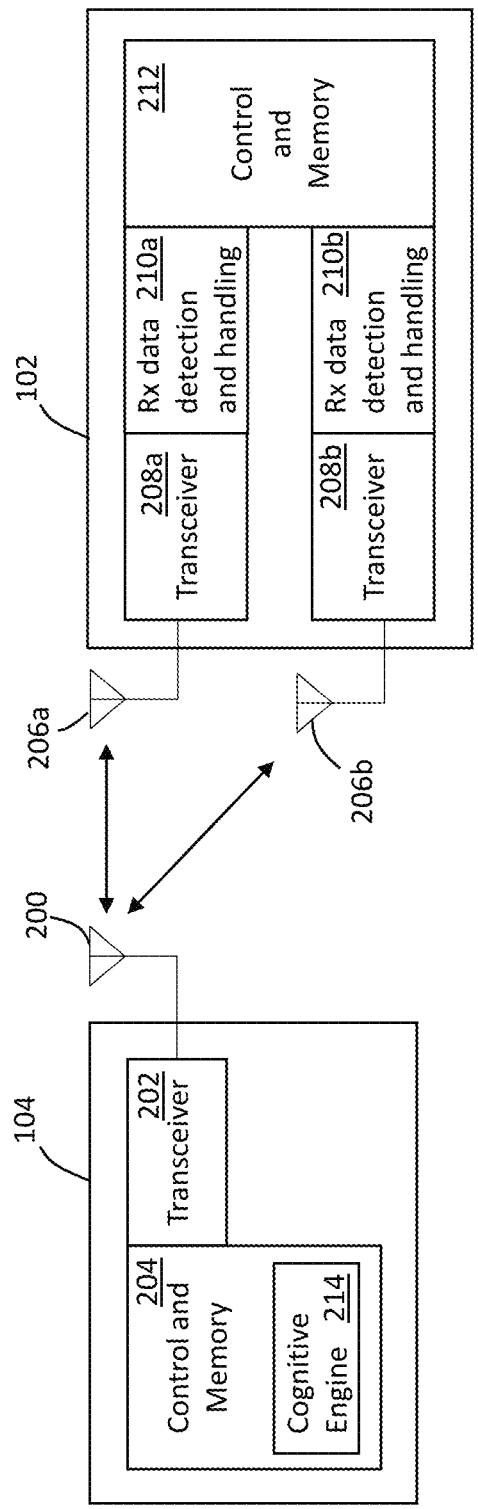
FIG. 2 is a block diagram of two example devices configured to communicate over a wireless network.

FIG. 2 is a block diagram illustrating an example receiver 102 and an example transmitter 104. While illustrated as a node and a gateway, the transmitter 104 and the receiver 102 can each be any node 104a-104h and 114a-114h, gateway 102a, 102b, and 110, or access device 112a and 112b that wirelessly transmits and receives, respectively. The transmitter 104 includes an antenna 200, a transceiver 202, and a control and memory circuit 204. The receiver 102 includes antennas 206a and 206b, transceivers 208a and 208b, receiver data detection and handling circuits 210a and 210b, and a control and memory circuit 212. The control and memory circuit 204 of the transmitter 104 includes a cognitive engine 214.

In the example illustrated in FIG. 2, the receiver 102 is a gateway device that includes two transceivers 208a and 208b. In an example, the two transceivers 208a and 208b can be used to communicate with multiple nodes on multiple channels simultaneously. In another example, the two transceivers 208a and 208b can be used to redundantly receive the same data and the receiver 102 can employ antenna diversity to select the best signal for a respective frequency channel. The transceivers 208a and 208b can be wide bandwidth transceivers 208a and 208b that are agile across a frequency range (e.g., band) over which the nodes will be communicating (e.g., in a channelized manner). For example, in a network that communicates on the 2.4 GHz Industrial, Scientific, and Medical (ISM) band, each transceiver 208a and 208b may be agile across a portion or the entirety of the full 83.5 MHz ISM band (2.4 GHz to 2.4835 GHz). In this example, the transceiver 202 of the transmitter 104 can be implemented as a narrow band transceiver configured to communicate on allocated channels within the wider band. While illustrated as transceivers, receiver 102 and transmitter 104 can include separate transmit and receive circuitry. Use of the ISM band is illustrative, and other frequency ranges can be used according to regulatory and technical considerations.

In an example, the control and memory circuit 212 can include one or more application-specific or general-purpose processor circuits. Such circuits can include system-on-chip (SoC) realization or such circuits can be field-programmable. As an illustrative example, the control and memory circuit 212 can include two controllers, one being a field programmable gate array (FPGA) and the other being a digital signal processor (DSP). The FPGA can be connected to control multi-channel communication using the two transceivers 208a and 208b, for example, and the DSP can be used for real-time processing such as downsampling, upsampling, coding, decoding, and packet formation and processing. In other examples, the control and memory circuit 212 can include any number of controllers including FPGAs, DSPs, microprocessors, application specific integrated circuits (ASICs) or other digital logic circuits.

The control and memory circuit 212 can include one or more volatile or non-volatile memories. For example, the control and memory circuit 212 can include one or more non-volatile memories including read-only memories (ROMs), flash memories, solid state drives, or any other non-volatile memory, and one or more volatile memories including, for example, static or dynamic random-access memories (RAM).

In an example, the control and memory circuit 204 can include one or more controllers including FPGAs, DSPs, microprocessors, application specific integrated circuits (ASICs) or other digital logic circuits, and one or volatile or non-volatile memories. The control and memory circuit 204 can also include the cognitive engine 214. The cognitive engine 214 can store or otherwise house a representation of one or more models of the network environment and/or one or more algorithms, for example, that the transmitter 104 can reference when establishing link configurations.

In an example, the transmitter 104 can use its transceiver 202 to monitor and collect data regarding the radio-frequency (RF) environment of the network, as well as collect information regarding transmitted and received communications. The collected data can be used to form or adjust one or more models of the environment within the cognitive engine 214 using one or more learning techniques, for example. The models can be stored as an analytical representation using one or more data structures implemented in memory of the control and memory circuit 204. Using output of the cognitive engine 214, the transmitter 104 can intelligently select wireless link parameters each time the transmitter 104 needs to transmit data to the receiver 102. The learning technique can include using one or more of a regression model or other model such as a neural network or a rules-based approach such as a decision tree. For example, information indicative of link degradation corresponding to specific channels can trigger modification of link parameters such as channel selection, modulation technique, output power, receiver gain, and the like. In other examples, the cognitive engine 214 one or more algorithms configured to receive collected data and output one or more selected parameters without the use of models.

The receiver 102 includes receiver data detection and handling circuits 210a and 210b that are each configured to identify and handle wireless link configurations based on incoming data transmissions. While illustrated as a stand-alone circuit, in other examples, the receiver data detection and handling circuits 210a and 210b can be integrated with respective transceivers 208a and 208b, or control and memory circuit 212. The data detection and handling circuits 210a and 210b can be implemented as application specific integrated circuits, using a field programmable gate array (FPGA), or using any other analog or digital circuitry.

The receiver 102 and the transmitter 104 can include other components not illustrated in FIG. 2. For example, the transmitter 104 can include a local power source such as a battery or energy harvester circuit, and one or more sensors configured to sense characteristics of the environment. In some examples, the receiver 102 can also be configured for wired communication with one or more of another access device or a backend system. The wired connection can be an Ethernet connection, Controller Area Network (CAN) connection, serial port interface (SPI) or any other wired connection, such as to facilitate integration with other circuitry. The receiver 102 can also include a cognitive engine similar to cognitive engine 214 configured to collect data regarding the environment. The receiver 102 can use this cognitive engine for its own operation or can send data to the transmitter 104 to supplement the cognitive engine 214, for example.

Figure 3:
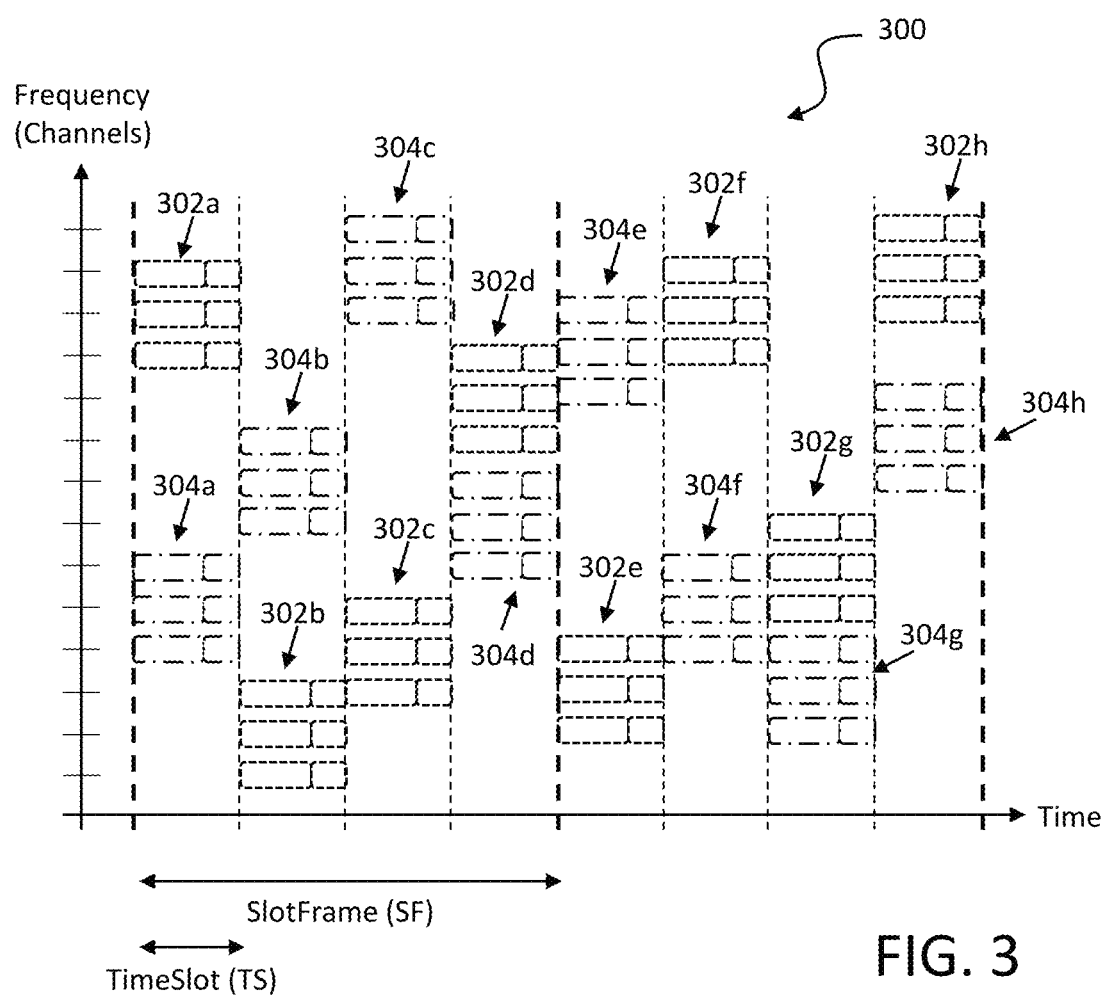
FIG. 3 is a diagram illustrating an example time synchronized channel hopping (TSCH) schedule that allows communication on multiple channels.

FIG. 3 illustrates an example time synchronized channel hopping (TSCH) schedule 300 for the network 100a, such as can be controlled or established using the model mentioned in relation to other examples herein. In an example, the receiver 102 is configured to permit simultaneous communication with two transmitters 104 on two respective channels. The network 100a can schedule communication between the transmitters 104 and the receivers 102 so that each transmitter 104 knows when, and at what frequency, to transmit. While illustrated as permitting two nodes to communicate with an access device simultaneously, other examples can allow any number (N) of nodes to communicate simultaneously with the access device. While discussed as implemented using TSCH, the networks 100a and 100b can be implemented using any other wireless scheduling protocol.

For the TSCH schedule 300, a TimeSlot (TS) is defined. This can be any amount of time, such as 10 ms, to allow for a transmitter 104 to transmit a communication to the receiver 102 and receive an acknowledgement (ACK) from the receiver 102. Each transmitter 104a-104h is allocated one or more predefined TimeSlots within each SlotFrame (SF). The TimeSlots can be static or dynamic, for example, to accommodate transmission of data at any one of several transmission data rates. Each SlotFrame includes enough TimeSlots to permit communication from each transmitter 104 to the receiver 102. Each TimeSlot includes data communications 302a-302h from a first transmitter 104 and data communications 304a-304h from a second transmitter 104.

The channel frequency is also allocated for each transmitter 104 for each SlotFrame. In the example illustrated in FIG. 3, each transmitter 104 receives a set of three possible channel frequencies on which to communicate for each respective TimeSlot. This is illustrated by the three possible data communications on three respective channels for each data communication 302a-302h and 304a-304h. For example, for the first SlotFrame illustrated in FIG. 3, a transmitter 104 may be provided three possible channels 302a on which to communicate, and for the second SlotFrame, may be provided with three possible channels 302e. In other examples, any number of preselected frequencies can be provided to each transmitter 104 for each TimeSlot.

As seen in FIG. 3, a transmitter 104 can select between several channels on which to transmit. In addition to channel frequency, the transmitter 104 can also select, among others, a transmission data rate, modulation scheme, packet format, and channel coding scheme. The transmitter 104 uses the selected link parameters to prepare and execute a data transmission for the receiver 102. The receiver 102 has limited knowledge of the link configuration that the transmitter 104 has selected prior to receiving the data transmission. Once the receiver 102 receives the data transmission, a respective one of the receiver data detection and handling circuits 210a and 210b identifies the link configuration using information extracted from the data transmission. A payload of the data transmission can then be extracted using the identified link configuration. The receiver 102 can then package and send the ACK using the identified link configuration, for example.

Figure 4:
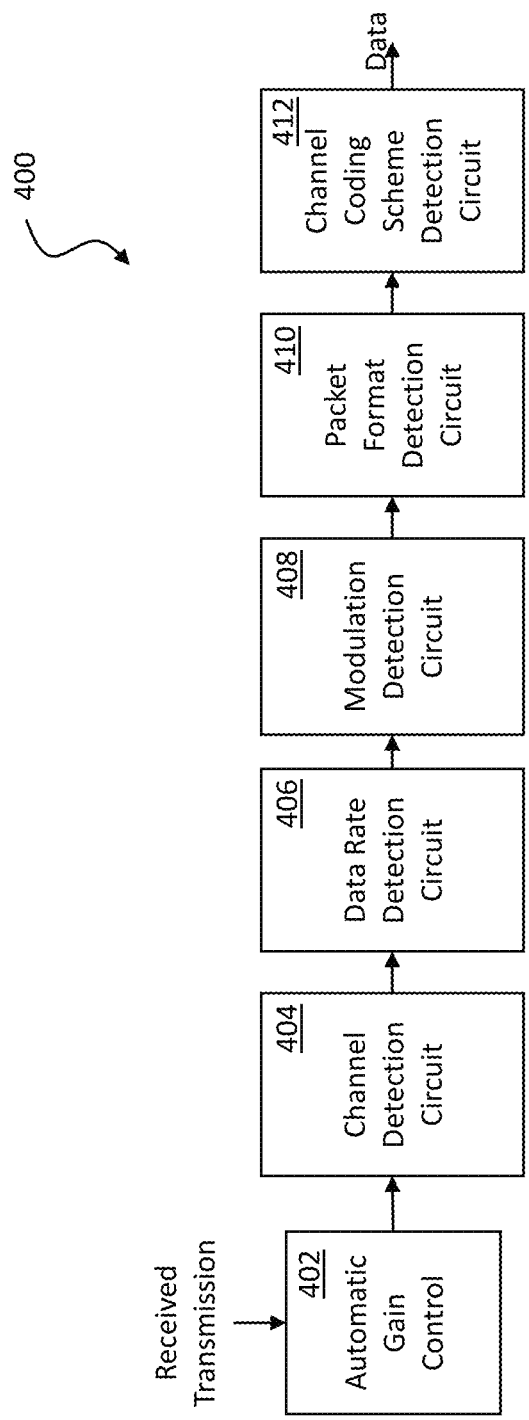
FIG. 4 is a block diagram illustrating an example receiver data detection and handling circuit.

FIG. 4 is a block diagram illustrating an example circuit 400 of one of the receiver data detection and handling circuits 210a and 210b. The circuit 400 includes an automatic gain control circuit 402, a channel detection circuit 404, a data rate detection circuit 406, a modulation detection circuit 408, a packet format detection circuit 410, and a channel coding scheme detection circuit 412. A received transmission from the transmitter 104, for example, is received by a respective transceiver 208a and 208b and provided to the automatic gain control circuit 402.

The automatic gain control circuit 402 is configured to adjust the received transmission to a desired amplitude for the remainder of the circuit 400. This allows the transmitter 104 to select from various transmission power levels for the data transmission. For example, if there is very little RF interference present on a selected channel, the transmitter 104 may select a low transmission power level for the data transmission to reduce power consumption within the network. The automatic gain control circuit 402 can receive the data transmission at the lower level and amplify the signal to provide a desired amplitude for the remainder of the circuit 400.

The channel detection circuit 404 receives the signal from the automatic gain control circuit 402 at the desired amplitude and is configured to identify a frequency indicative of the channel on which the data transmission was communicated. In the example illustrated in FIG. 3, the transmitter 104 can select between three channels for each transmission. In another example, the receiver 102 and the transmitter 104 are part of an unslotted, multi-channel, contention-based network in which the transmitter 104 is permitted to use any of N channels or a subset of the N channels. This network may operate in the 2.4 GHz ISM band, for example, with 25 channel frequencies. In this example, the channel detection circuit 404 can be configured to identify which of the 25 channels was used for the data transmission from the transmitter 104.

The data rate detection circuit 406 is configured to identify a data rate of the original transmission. The possible transmission data rates can be defined by the network, for example, and selected by the transmitter 104 for each transmission. In an example, the transmitter 104 may select between transmission data rates of 2 Mbps, 500 Kbps, and 50 Kbps. The data rate detection circuit 406 can determine with which of the three data rates the data was transmitted from the transmitter 104. While the above example discussed three specific data rates, any number of possible transmission data rates may be selectable by the transmitter 104.

The modulation detection circuit 408 is configured to identify a modulation scheme used by the transmitter 104 in transmitting the data. The network may define a number of modulation schemes from which the transmitter 104 can select for transmitting the data. In one example, the transmitter 104 can select between phase-shift keying (PSK), frequency-shift keying (FSK), amplitude-shift keying (ASK), on-off keying (OOK), or any other modulation scheme. Once the circuit 400 has identified the transmission channel, the transmission data rate, and the modulation scheme, the original transmission can be demodulated, and the original transmitted bit data can be recovered by the receiver 102.

The packet format detection circuit 410 is configured to determine a packet format of the original transmission. This can be accomplished using the demodulated bit data or using other identified parameters of the data transmission. The network may define several packet formats with which the transmitter 104 can package the data. In one example, this includes preamble length and format, sync word length and format, payload length, and cyclic redundancy check (CRC) length and format. In an example, the packet format and detection circuit 410 can detect a preamble format from the demodulated bit data and then, based on the preamble format, can determine the remaining packet format.

The channel coding scheme detection circuit 412 is configured to identify a channel coding scheme of the original transmission from the transmitter 104. The network can define several channel coding schemes, or forward error correction (FEC) schemes, that the node device can choose from. In an example, the channel coding scheme detection circuit 412 can detect the presence of a preamble, a preamble format, start of frame pattern, data rate, or other property of the data transmission from the demodulated bit data, and then, based on the detected parameter, can determine the channel coding scheme. In another example, another property of the transmission, such as the identified transmission data rate, can be used to detect the channel coding scheme. Once the link configuration has been determined, the data can be provided as output along with the determined parameters for further processing by the control and memory circuit 212, for example.

While illustrated as six separate circuits that perform link parameter detection in a specific order, the receiver data detection and handling circuits 210a and 210b can be implemented to detect some parameters in parallel and in any order. For example, a network can define channel coding schemes based on selected data rate. Thus, the channel coding scheme can be detected and handled by the data rate detection circuit 406, rather than by a separate circuit later in the process. Likewise, other circuit functions can be combined or reordered based on the definitions of the network.

Figure 5:
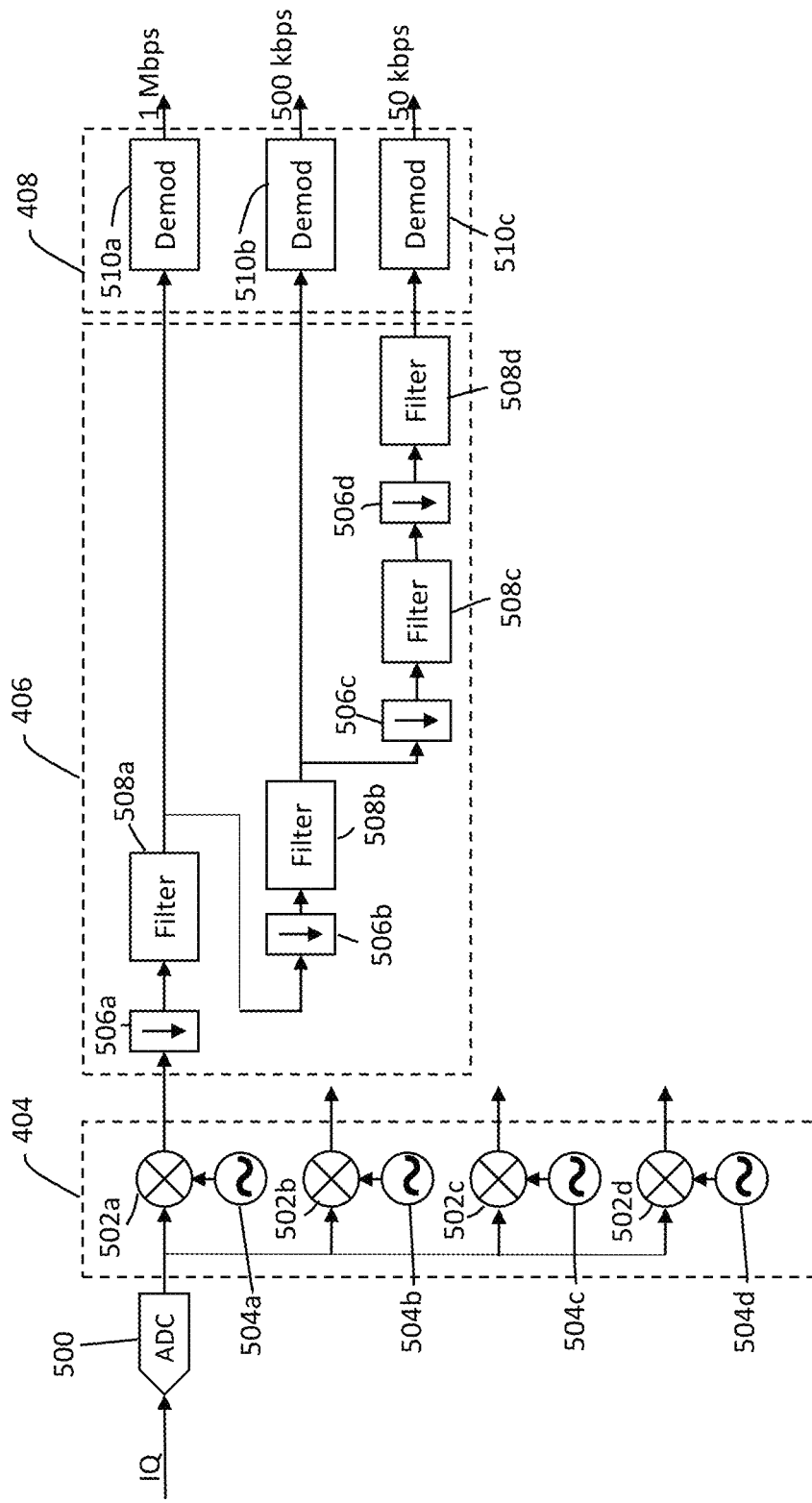
FIG. 5 is a circuit diagram illustrating example circuits for channel detection, data rate detection, and modulation detection.

FIG. 5 is a circuit diagram illustrating example circuits for the channel detection circuit 404, the data rate detection circuit 406, and the modulation detection circuit 408. The channel detection circuit receives a signal from an analog-to-digital converter 500, which receives in-phase and quadrature (IQ) data from the automatic gain control circuit 402 and converts the IQ signals into digital signals for the channel detection circuit 404. The channel detection circuit 406 can include digital down converters that each include one of respective mixers 502a-502d and one of respective oscillators 504a-504d. The data rate detection circuit 408 includes downsampling circuits 506a-506d and filter circuits 508a-508d, and the modulation detection circuit 408 includes demodulators 510a-510c.

Each mixer 502a-502d can be an image cancelling mixer that receives the digitized I and Q signals as input from the analog-to-digital converter 500. Each mixer 502a-502d also receives an output of a respective oscillator 504a-504d as input. The oscillators 504a-504d can each be digital local oscillators (DLO) or numerically controlled oscillators (NCO), for example, tuned to a frequency indicative of, or otherwise corresponding to, a respective channel (a center frequency, for example). In the embodiment illustrated in FIG. 5, the channel detection circuit 404 can identify transmissions from the transmitter 104 on four channels and discriminate the frequency used by the transmitter 104 from other concurrently transmitting circuits. However, in other examples, the channel detection circuit 404 can include any number of digital down converters to identify any number of channels. In one example, the channel detection circuit 404 includes 25 digital down converters to identify incoming transmissions on 25 different channels.

Each mixer 502a-502d outputs digital I and Q signals centered around a baseband, for example, and provides the signals to a respective data rate detection circuit 406, which includes downsampling circuits 506a-506d, and filter circuits 508a-508d. In FIG. 5, for clarity, only one data rate detection circuit 406 is illustrated. However, the outputs of each mixer 502b-502d can be provided to a respective circuit identical to the data rate detection circuit 406 illustrated in FIG. 5.

The data rate detection circuit 406 receives respective signals from one of the mixers 502a-502d and the signals are downsampled by the downsampling circuit 506a, which downsamples the signals by a rate dependent on the sampling rate of the ADC 500. The filter 508a can be a digital filter with a corner frequency of 500 kHz, for example, and the output of the filter 508a is a filtered signal sampled at a rate of 1 Mbps.

The output of the filter 508a is also provided to a cascaded processing path that includes the downsampling circuit 506b and the filter circuit 508b. The downsampling circuit 506b can further downsample the signal and the filter circuit 508b can have a corner frequency of 250 kHz, for example. The resultant filtered signal, which is sampled at a rate of 500 kbps, is provided to a second demodulation circuit 510b of the modulation detection circuit 408.

The output of the filter 508b is also provided to a cascaded processing path that includes the downsampling circuits 506c and 506d and the filter circuits 508c and 508d. The output signal of filter circuit 508d, which is sampled at a rate of 50 kbps, for example, can be provided to a third demodulation circuit 510c. While illustrated as three cascaded circuits configured to sample data at three respective data rates, the data rate detection circuit 406 can include any number of cascaded paths, and the downsampling and filter circuits can be configured to provide sampling for any data rates.

Each of the demodulators 510a-510c can demodulate the signals from a respective path from the data rate detection circuit 406 using any of a preselected set of modulation schemes. In an example, the transmitter 104 can select between three modulation schemes. Each demodulator 510a-510c can include three parallel processing paths, one for each possible modulation scheme. Each demodulator 510a-510c can provide an output for each respective processing path that is a bit stream at the respective data rate. Preamble detection can then be used, for example, on each of the respective bit streams to detect which path correctly identified the channel, data rate, and modulation scheme. In the example illustrated in FIG. 5, four channel detection outputs each have three data rate detection outputs, which each have three modulation detection outputs, resulting in 36 total outputs from the demodulation detection circuit 408, one of which will include the correct demodulated bit stream based on the wireless link parameters selected by the transmitter 104.

Figure 6:
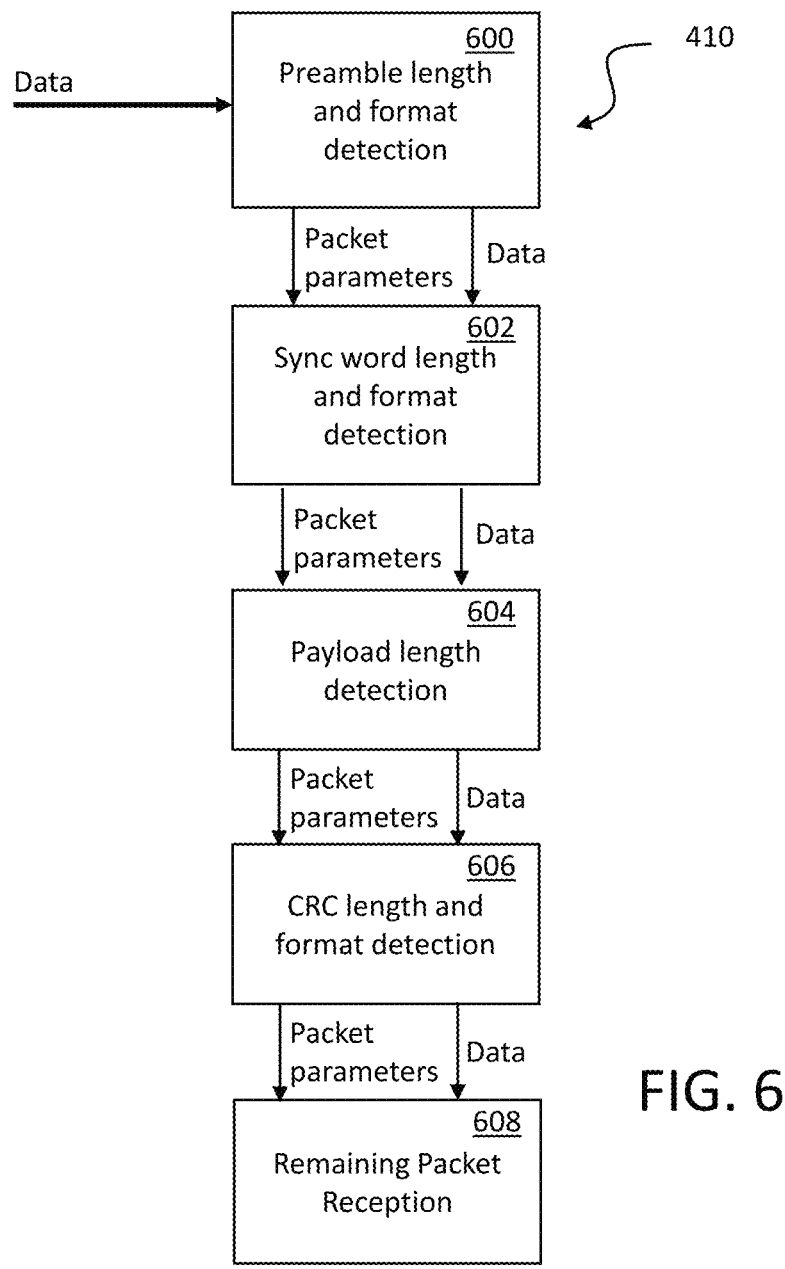
FIG. 6 is a block diagram illustrating an example packet format detection circuit.

FIG. 6 is a block diagram illustrating an example packet format detection circuit 410. The packet format detection circuit 410 includes a preamble length and format detection circuit 600, a sync word length and format detection circuit 602, a payload length detection circuit 604, and a CRC length and format detection circuit 606. A remaining packet reception circuit 608 is configured to receive the bit data and the detected packet format parameters and perform further analysis on the data, such as determination of a coding scheme, and extraction of data in the payload. The remaining packet reception circuit 608 can be part of the control and memory circuit 212 of the receiver 102, for example.

The bit stream from the modulation detection circuit 408 is provided to the preamble length and format detection circuit 600, which detects a preamble of the data transmission from the transmitter 104. In one example, the preamble length and format detection circuit 600 can include several parallel processing paths that each look for, and detect, a preamble of a predetermine length and format. In another example, the preamble length and format can be based on the detected channel, the detected data rate, or the detected modulation.

The sync word length and format detection circuit 602 is configured to detect a sync word of the data transmission from the transmitter 104. In one example, the sync word length and format detection circuit 600 can include several parallel processing paths that each look for, and detect, a sync word of a predetermined length and format. In another example, the sync word length and format can be based on the detected channel, the detected data rate, the detected modulation, or the detected preamble format and length.

The payload length detection circuit 604 is configured to determine a length of the payload of the data transmission from transmitter 104. In an example, the payload length detection circuit 604 can detect the payload length based on the detected channel, the detected data rate, the detected modulation, the detected preamble format and length, the sync word format and length, or a dedicated field. Similarly, the CRC length and format detection circuit 606 can detect the length and format of the CRC using the detected channel, the detected data rate, the detected modulation, the detected preamble format and length, the sync word format and length, or the detected payload length.

Figure 7:
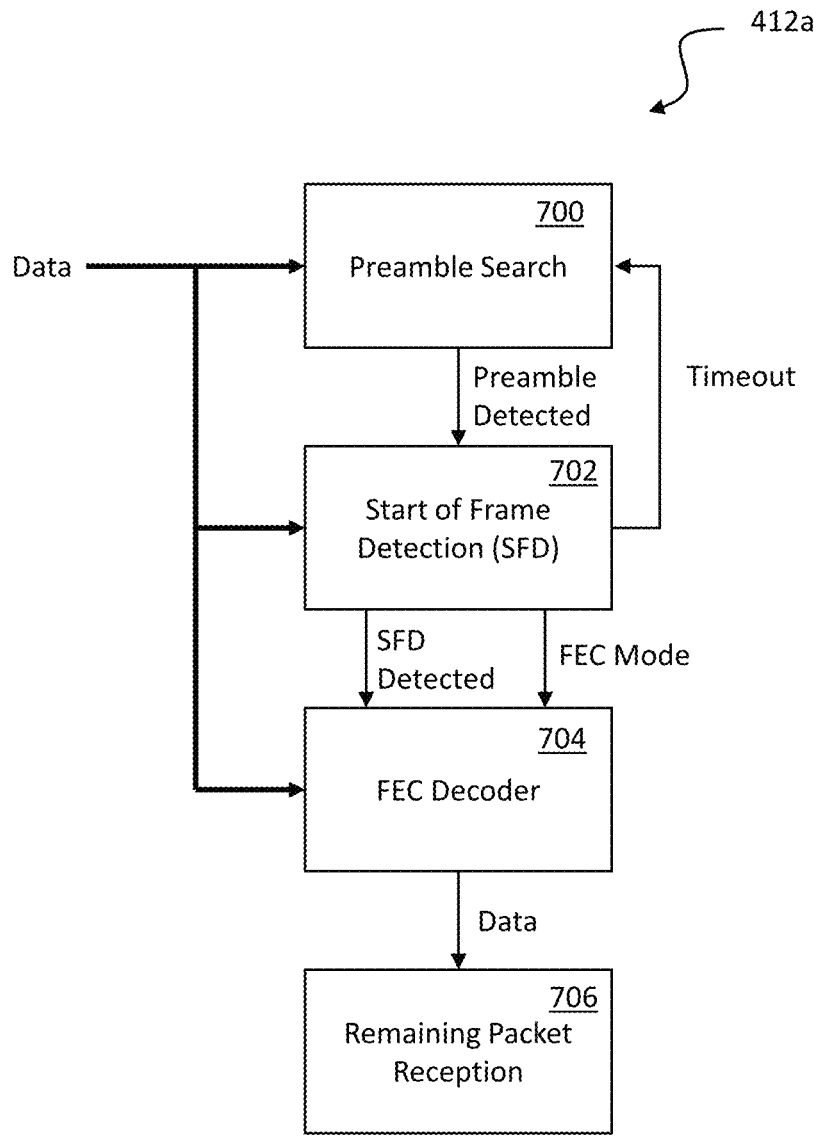
FIG. 7 is a block diagram illustrating an example channel coding scheme detection circuit.

FIGS. 7-12 are block diagrams illustrating example channel coding scheme detection circuits 412. FIG. 7 is a block diagram illustrating an example channel coding scheme detection circuit 412a. The channel coding scheme circuit 412a includes a preamble search circuit 700, a start of frame detection circuit 702, and a forward error correction (FEC) decoder circuit 704. Like the remaining packet reception circuit 608, the remaining packet reception circuit 706 can receive the data and perform further operations on the data, such as extraction and analysis of the data in the payload of the packet. The bit data received by channel coding scheme detection circuit 412a can be received through packet format detection circuit 410, or directly from the modulation detection circuit 408, for example. In this example, the header of the packet is not encoded, so the preamble and the start of frame pattern can be detected without knowing the channel coding scheme. The preamble of the data transmission can be detected by the preamble search circuit 700 or can be detected by packet format detection circuit 410, which can provide an indication of the detected preamble to the channel coding scheme detection circuit 412a.

Figure 8:
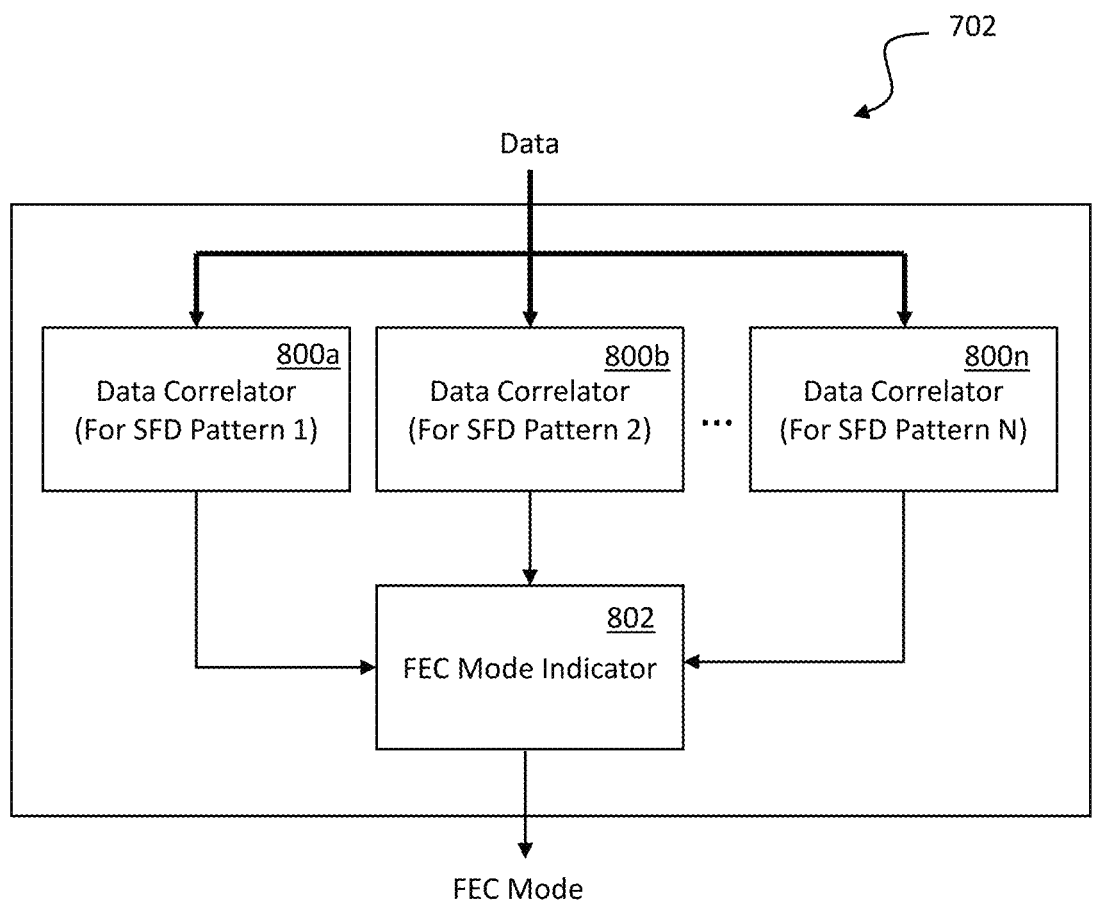
FIG. 8 is a block diagram illustrating an example start of frame detection circuit.

FIG. 8 is a block diagram illustrating an example start of frame detection circuit 702 of the channel coding scheme detection circuit 412a. The start of frame detection circuit 702 includes data correlators 800a-800n and an FEC mode indicator circuit 802. In the example illustrated in FIG. 8, there is a data correlator 800a-800n for each possible start of frame pattern. In one example, there are three start of frame patterns that a transmitter 104 can choose from when forming a data packet. Each of three data correlators 800a-800n are configured to detect a respective one of the possible three start of frame patterns. Upon detection of a start of frame pattern, the respective data correlator 800*a*-800*n* is configured to output a signal indicative of the detection.

The FEC mode indicator circuit 802 receives the detection signals from each of the data correlators 800*a*-800*n* and determines an FEC code indicative of the channel coding scheme. For example, the FEC mode indicator circuit 802 can analyze the respective detection signals and output a two-bit signal indicting one of three possible channel coding schemes. In another example, the start of frame detection circuit 702 can include 15 data correlators 800*a*-800*n*, and the FEC mode indicator circuit 802 can output a four-bit signal indicating one of 15 possible FEC modes.

Figure 9:
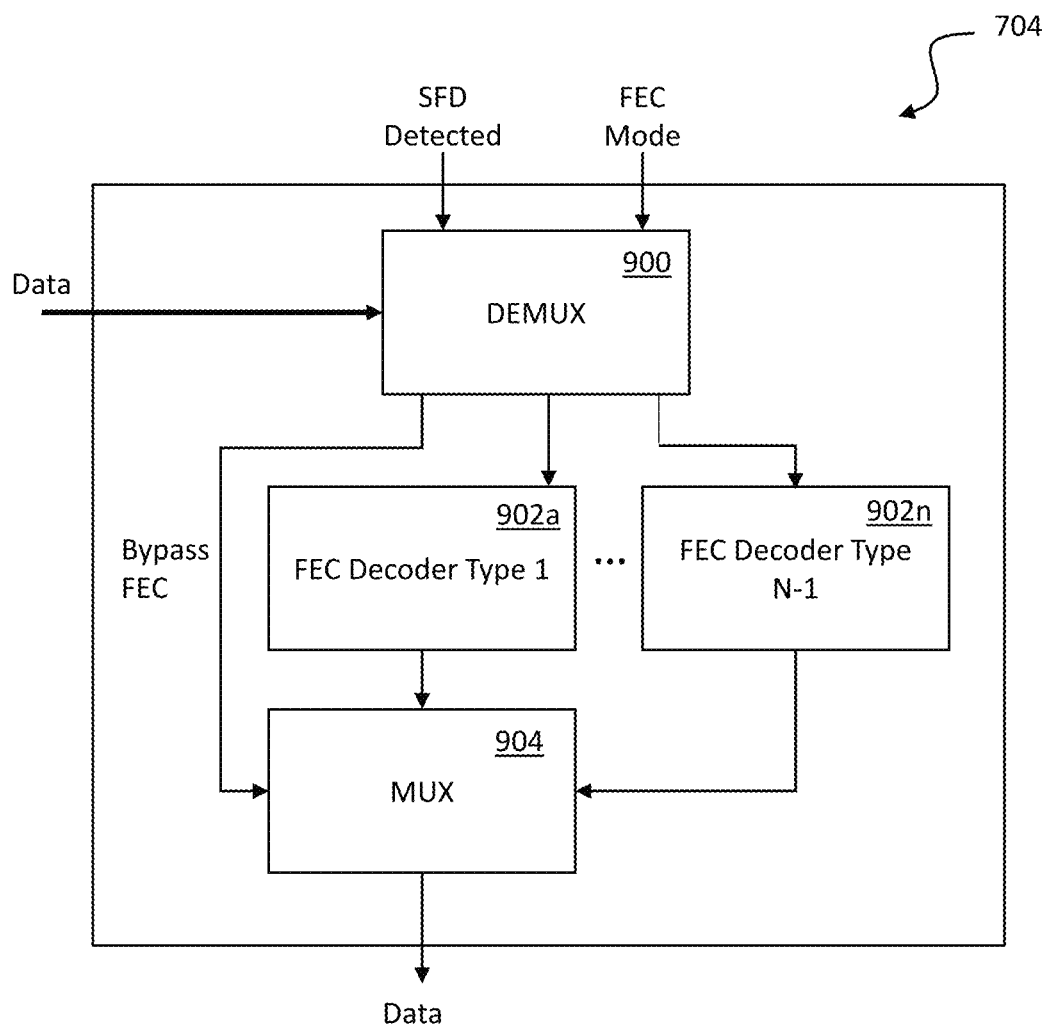
FIG. 9 is a block diagram illustrating an example forward error correction mode decoder circuit.

FIG. 9 is a block diagram illustrating an example forward error correction mode decoder circuit 704. The circuit 704 receives the bit data, a signal indicating that a start frame was detected, and the FEC code from FEC mode indicator circuit 802. The start frame detected signal can also be provided by the FEC mode indicator circuit 802 based on one of the data correlator signals indicating a detected start of frame pattern. The circuit 704 includes a demultiplexer circuit 900, FEC decoder circuits 902*a*-902*n*, and a multiplexer circuit 904.

The demultiplexer circuit 900 receives the start of frame detected signal, the FEC mode signal, and the bit data, and directs the bit data to the correct FEC decoder circuit 902 based on the FEC mode signal. The FEC mode signal can also indicate that no channel coding has been used, in which case the demultiplexer circuit 900 will send the bit data directly to the multiplexer circuit 904, bypassing the FEC decoder circuits 902*a*-902*n*. The respective FEC decoder circuit 902*a*-902*n* will decode the data bit stream using the selected channel coding scheme and provide the decoded bit stream to the multiplexer circuit 904. The multiplexer circuit 904 is configured to pass the respective decoded bit stream as output. The decoded bit stream can be provided to the control and memory circuit 212, for example, for payload extraction and further data processing, for example.

Figure 10:
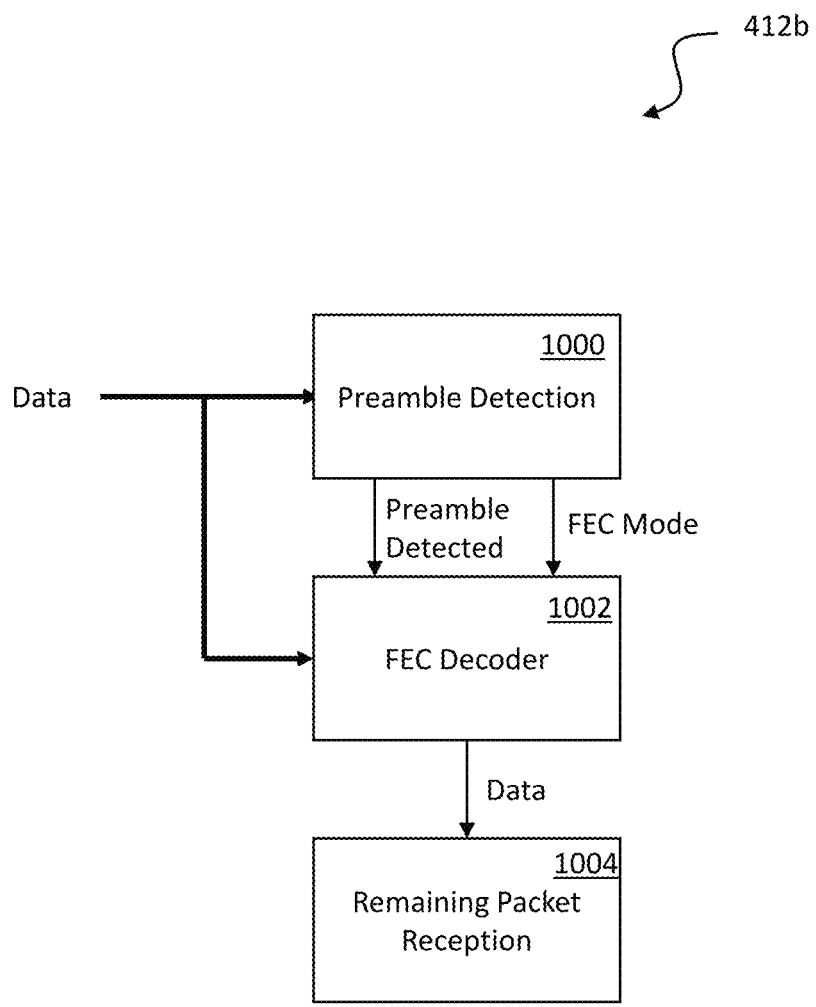
FIG. 10 is a block diagram illustrating another example channel coding scheme detection circuit.

FIG. 10 is a block diagram illustrating another example coding scheme detection circuit 412*b*. The channel coding scheme circuit 412*b* includes a preamble detection circuit 1000 and a forward error correction (FEC) decoder circuit 1002. Like the remaining packet reception circuit 706, the remaining packet reception circuit 1004 can receive the decoded data and perform further operations on the data, such as payload extraction and analysis of the data in the payload. The bit data received by channel coding scheme detection circuit 412*b* can be received through packet format detection circuit 410, or directly from the modulation detection circuit 408, for example.

The preamble of the data transmission can be detected by the preamble detection circuit 1000. The preamble detection circuit 1000 can include several data correlators, for example, each capable of detecting a preamble format. The detected preamble format can be used to generate an FEC mode signal, which can be provided to the FEC decoder circuit 1002. The FEC decoder circuit 1002 can be configured similarly to FEC decoder circuit 704, decoding the data bit stream using the FEC mode signal from the preamble detection circuit 1000.

Figure 11:
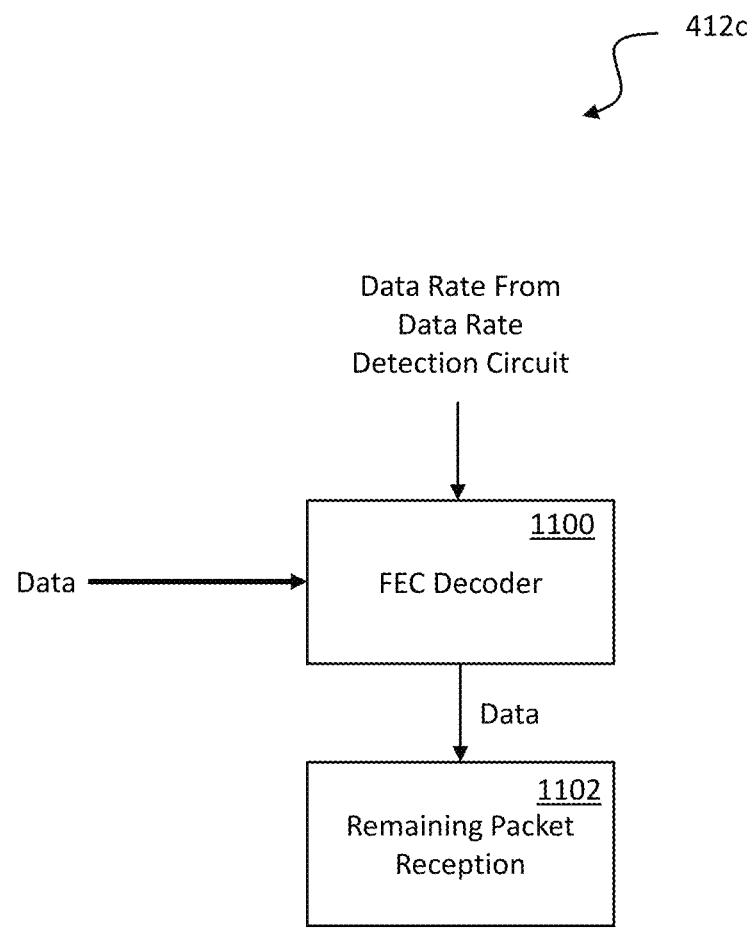
FIG. 11 is a block diagram illustrating another example channel coding scheme detection circuit.

FIG. 11 is a block diagram illustrating another example coding scheme detection circuit 412*c*. The channel coding scheme circuit 412*c* includes an FEC decoder circuit 1100. Like the remaining packet reception circuits 706 and 1004, the remaining packet reception circuit 1102 can receive the decoded data and perform further operations on the data, such as payload extraction and analysis of the data in the payload. The bit data received by channel coding scheme detection circuit 412*c* can be received through packet format detection circuit 410, or directly from the modulation detection circuit 408, for example. The FEC decoder circuit 1100 can be configured similarly to FEC decoder circuits 704 and 1002, decoding the data bit stream using the identified data rate from the data rate detection circuit 406.

Figure 12:
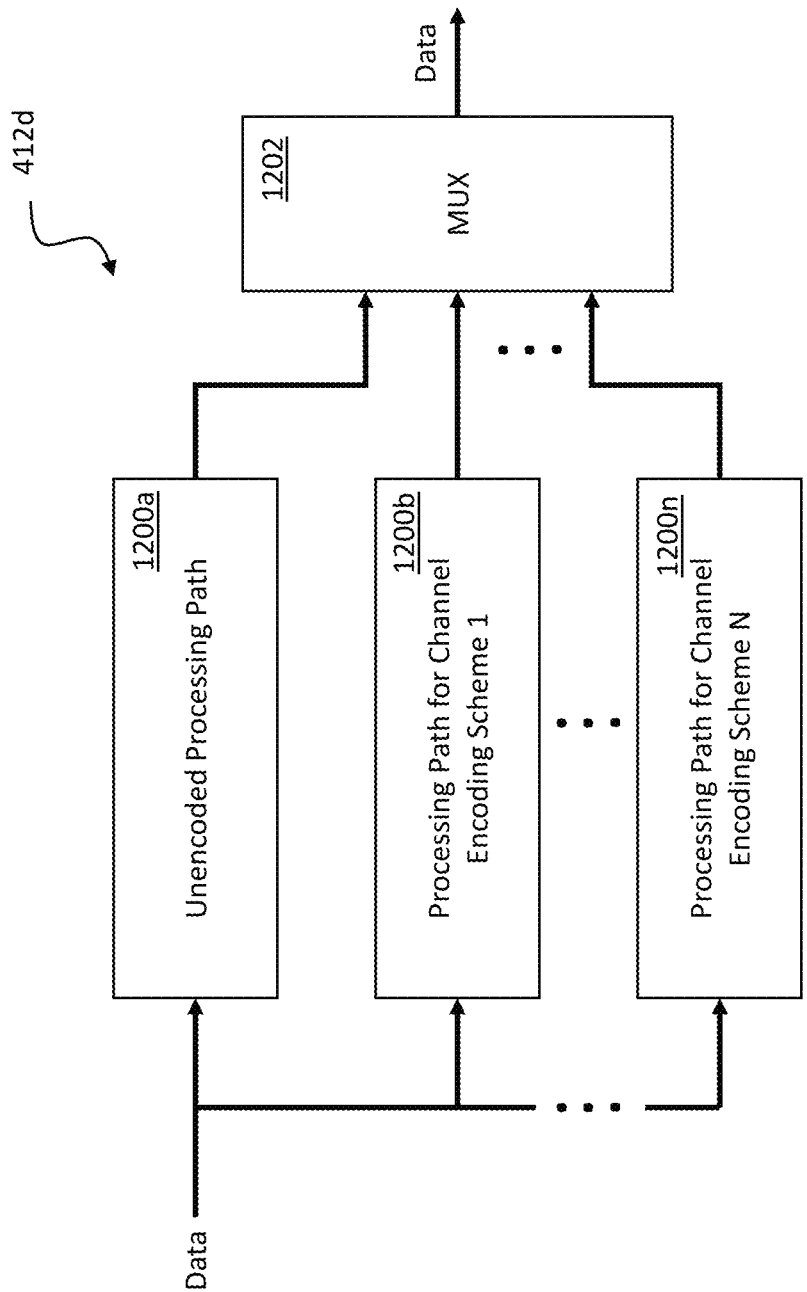
FIG. 12 is a block diagram illustrating another example channel coding scheme detection circuit.

FIG. 12 is a block diagram illustrating another example channel coding scheme detection circuit 412*d*. The channel coding scheme detection circuit 412*d* include parallel processing paths 1200*a*-1200*n* and a multiplexer circuit 1202. The bit data received by channel coding scheme detection circuit 412*d* can be received through packet format detection circuit 410, or directly from the modulation detection circuit 408, for example. The processing path 1200*a* can be an unencoded processing path that provides the bit data as output without performing any decoding. The other processing paths 1200*b*-1200*n* can be configured to perform decoding of the bit stream using a respective decoding scheme. For example, if the transmitter 104 can select from three channel coding schemes, the circuit 412*d* can include four processing paths 1200*a*-1200*n*, one for unencoded data, and three for the three possible channel coding schemes. The data from the parallel processing paths 1200*a*-1200*n* are provided to the multiplexer circuit 1202, which output the decoded bit stream, which can be provided to the control and memory circuit 212, for example, for payload extraction and processing.

By providing a transmitter that can establish a link configuration prior to each transmission, and a receiver that can identify the link configuration using only data transmitted from the transmitter, the power consumption of the transmitting device can be reduced, and network traffic can be reduced as there is no message overhead in management of the link configuration. Allowing instant configuration of link parameters can also improve quality of service (QoS) metrics, packet delivery reliability, and spectrum utilization.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A communication system providing adaptive establishment and detection of wireless link parameters, the communication system comprising:
   a first circuit configured to establish selected wireless link parameters from a plurality of specified selectable wireless link parameters and transmit a wireless communication using the selected wireless link parameters, wherein the selected wireless link parameters comprise a selected transmission channel; and
   a second circuit configured to receive the wireless communication, automatically identify the selected transmission channel of the selected wireless link parameters based on information extracted from the wireless communication, and extract a payload from the wireless communication using the selected wireless link parameters, the second circuit including a channel detection circuit configured to identify the selected transmission channel, wherein the channel detection circuit comprises:
   a plurality of tunable channel circuits configured to receive the wireless communication as input,
   wherein the channel detection circuit is configured to monitor respective outputs of the plurality of tunable channel circuits to identify the selected transmission channel,
   wherein the selectable wireless link parameters further include a selectable transmission data rate, a selectable modulation scheme, and a channel coding scheme, and wherein the second circuit further comprises:
   a data rate detection circuit configured to identify a data rate at which the wireless communication was transmitted;
   a modulation detection circuit configured to determine the modulation scheme; and
   a channel coding scheme detection circuit configured to determine the channel coding scheme of the wireless communication using the data rate identified by the data rate detection circuit,
   wherein the second circuit demodulates the wireless communication using the identified channel, the identified data rate, and the identified modulation scheme, to extract the payload.

2. The communication system of claim 1, further comprising:
   a node device that includes the first circuit, wherein the first circuit comprises a first antenna and a first transceiver circuit; and
   a gateway device that includes the second circuit, wherein the second circuit comprises a second antenna and a second transceiver circuit;
   wherein the node device and the gateway device are part of a network that uses time synchronized channel hopping for wireless communication scheduling.

3. The communication system of claim 2, wherein the gateway device is configured to communicate with the node device and other node devices of the network concurrently.

4. The communication system of claim 1, wherein the plurality of tunable circuits each comprise a mixer, each mixer receiving a signal representative of the wireless communication and an output of a local oscillator as input.

5. The communication system of claim 1, wherein the data rate detection circuit comprises:
   a first data rate circuit configured to provide an output at a first data rate; and
   a second data rate circuit arranged in a cascaded configuration with the first data rate circuit and configured to provide an output at a second data rate.

6. The communication system of claim 1, wherein the second circuit further comprises a packet format detection circuit configured to determine at least one of a preamble length, a preamble format, a sync word length, a sync word format, a payload length, a cyclic redundancy check length, or a cyclic redundancy check format of the wireless communication.

7. The communication system of claim 1, wherein the selected wireless link parameters include a channel coding scheme, and wherein the second circuit comprises a channel coding scheme detection circuit configured to determine the channel coding scheme of the wireless communication, and wherein the channel coding scheme detection circuit comprises:
   a preamble search circuit configured to detect a preamble of the first communication;
   a start of frame detection circuit configured to detect a start of frame pattern and output an error coding mode signal using the start of frame pattern; and
   a code indicator circuit configured to determine the channel coding scheme using the error coding mode signal.

8. The communication system of claim 7, wherein the start of frame detection circuit comprises:
   a plurality of data correlators each corresponding to a respective one of a plurality of possible start of frame patterns, wherein the plurality of data correlators are configured to output a plurality of detection signals; and
   a mode indicator circuit configured to output the error coding mode signal using the plurality of detection signals.

9. The communication system of claim 1, wherein the selected wireless link parameters include a channel coding scheme, and wherein the second circuit comprises a channel coding scheme detection circuit configured to determine the channel coding scheme of the wireless communication, and wherein the channel coding scheme detection circuit comprises:

a preamble detection circuit configured to detect a preamble of the first communication and a format of the preamble, and output an error coding mode signal using the preamble format; and an error coding decoder circuit configured to determine the channel coding scheme using the error coding mode signal.

10. The communication system of claim 1, wherein the selected wireless link parameters include a channel coding scheme, and wherein the second circuit comprises a channel coding scheme detection circuit configured to determine the channel coding scheme of the wireless communication, and wherein the channel coding scheme detection circuit comprises:

a plurality of concurrent processing paths that include a path for an unencoded scheme and paths for each of a plurality of coding schemes;

wherein the channel coding scheme is determined based on successful detection of a unique sequence in the wireless communication by a respective one of the plurality of concurrent processing paths.

11. A method of performing wireless communication in a network, the method comprising:

establishing, by a first circuit, first selected link parameters of a plurality of selectable link parameters for wireless communication, wherein the first selected link parameters comprise a selected transmission channel, a selected transmission data rate, a selected transmission modulation format and a channel coding scheme;

transmitting, by the first circuit, a first communication using the first selected link parameters;

receiving, by a plurality of tunable circuits of a channel detection circuit of a second circuit, the first communication; monitoring output of the plurality of tunable circuits to identify the selected transmission channel;

identifying the selected transmission data rate at which the first communication was transmitted;

determining the transmission modulation format;

determining the channel coding scheme of the first communication using the identified transmission data rate, and extracting, by the second circuit, a payload of the first communication using the first selected link parameters by demodulating the first communication using the frequency corresponding to the transmission channel, the identified transmission data rate, and the identified transmission modulation format.

12. The method of claim 11, wherein establishing, by the first circuit, the first selected link parameters further comprises selecting at least one of a transmission power level of a transceiver of the first circuit or a transmission packet format for the first communication.

13. The method of claim 11, further comprising:

detecting, by the second circuit, a preamble of the first communication;

determining, by the second circuit, a start of frame pattern of the first communication upon detection of the preamble;

determining, by the second circuit, an error code using the start of frame pattern; and adapting, by the second circuit, to encoding of the first communication using the error code.

14. The method of claim 11, further comprising:

processing, by the second circuit, the first communication using a plurality of concurrent processing paths, wherein the plurality of concurrent processing paths include a path for an unencoded scheme, and paths for each of a plurality of coding schemes; and determining, by the second circuit, a channel coding scheme of the first communication based on successful detection of a unique sequence in the first communication by a respective one of the plurality of concurrent processing paths.

15. The method of claim 11, further comprising:

establishing, by the first circuit; second selected link parameters of the plurality of selectable link parameters, the second selected link parameters different than the first selected link parameters;

transmitting, by the first circuit, a second communication wirelessly using the second selected link parameters;

receiving, by the second circuit, the second communication;

determining, by the second circuit, the second selected link parameters based only on information extracted from the second communication and the plurality of selectable link parameters, wherein the second circuit is not required to have prior information concerning the second selected link parameters established by the first circuit prior to receiving the second communication; and extracting, by the second circuit, a payload of the second communication using the second selected link parameters.

16. The method of claim 11, further comprising:

transmitting, by the second circuit, a second communication using the first selected link parameters.

17. A wireless network comprising:

a node device comprising:

means for establishing selected wireless link parameters of a plurality of selectable link parameters, wherein the selected wireless link parameters comprise a selected transmission channel, a selected transmission data rate, a selected transmission modulation format, and a channel coding scheme; and means for transmitting a wireless communication using the selected wireless link parameters; and an access device comprising:

means for receiving the wireless communication;

means for automatically identifying one or more of the selected wireless link parameters using information extracted from the wireless communication, the means for automatically identifying the one or more selected wireless link parameters comprising:

a plurality of tunable channel circuits configured to receive the wireless communication as input; and means for monitoring respective outputs of the plurality of tunable channel circuits to identify the selected transmission channel;

means for identifying the selected transmission data rate;

means for determining the selected transmission modulation format;

means for determining the channel coding scheme of the first communication using the identified transmission data rate; and means for extracting a payload of the wireless communication using the selected wireless link parameters.

* * * * *